United States Patent Office 3,402,770
Patented Sept. 24, 1968

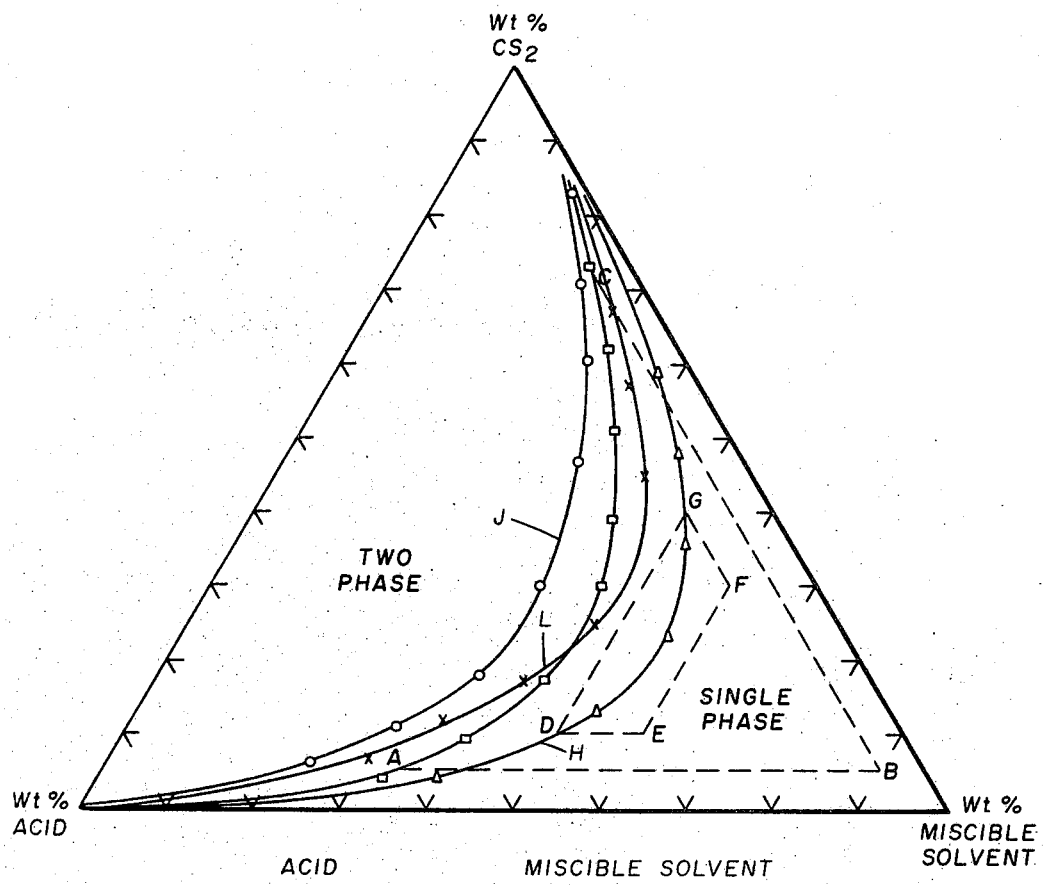

3,402,770
MULTIPLE-PURPOSE SOLVENT AND METHOD FOR TREATING SUBTERRANEAN FORMATIONS
Joseph U. Messenger, Dallas, Tex., assignor to Mobil Oil Corporation, a corporation of New York
Filed June 2, 1965, Ser. No. 460,711
11 Claims. (Cl. 166—40)

ABSTRACT OF THE DISCLOSURE

This specification discloses a multicomponent solution which has many uses in cleaning up a well and the surrounding subterranean formation, and method for employing the solution. Specifically, the solution contains as its essential elements an organic solvent for oil and asphalt and a liquid having mutual solubility for oil and water. Other components such as acid, or surfactant, may be added and the solution will still remain a single-phase solution. The solution is mainly useful as a solvent to remove a wide variety of flow-restricting materials such as damaging water, mud filtrate, emulsions, wax, asphalt, and scale, even when present in layered form. Illustrative of the organic solvent for oil and asphalt are carbon disulfide, benzene, toluene, and xylene. Illustrative of the liquid having mutual solubility for oil and water are ethylene glycol monomethyl ether, ethylene glycol monoethyl ether, ethylene glycol monobutyl ether, isopropyl alcohol, tertiary butyl alcohol, and diethylene glycol monomethyl ether. Illustrative of acids which can be added and still form a single-phase solution are concentrated hydrochloric, hydrofluoric, formic, sulfonic, and acetic.

---

This invention relates to treating a well or a subterranean formation. More particularly, the invention relates to dissolution of flow-restricting matter from a well or a subterranean formation.

In attempting to reach and produce hydrocarbonaceous material contained in subterranean formations, wells are drilled thereinto from the surface of the earth. During drilling of the wells, the filtrate from aqueous drilling fluid often enters the subterranean formations and results in restricted permeability of the formation to fluids. This result is sometimes referred to as "water blocking." Alternatively, the drilling fluid may be an emulsion, or components thereof may form emulsions with the liquids indigenous to the subterranean formation. Such emulsions also often restrict the permeability of the subterranean formation. Further, the hydrocarbonaceous fluids produced from a subterranean formation into a wellbore often form precipitates of waxy or asphaltic components, as well as inorganic scale, which restrict the flow of fluids.

It has been past practice to dissolve these restrictions to flow by various solvents. Such solvents have included aqueous solutions of surfactants; organic solvents, such as isopropanol; or acids, such as hydrochloric acid. These treating solvents have accomplished specific dissolution and hence limited cleaning of the well and subterranean formation. However, they have not been general in applicability, and the solvent for a particular plugging material has not been efficacious in removing the other types of flow-restricting materials. For example, some solvents may remove the damaging water from the subterranean formation but do not dissolve the wax, asphalt, emulsions, or inorganic deposits, such as the scale. In similar manner, some organic solvents dissolve the oil or asphaltic portion from the emulsion but may not remove damaging water or the inorganic deposits. Further, acid solutions remove inorganic deposits to which they can achieve access but do not dissolve the organic deposits. Often the inorganic deposits are themselves covered or partially covered by an organic coating, such as an asphaltic coating, which prevents access of such acid solvents thereto. Moreover, acid solvents often attack the equipment in the well. Further, the acid solvents often react in situ to form an asphaltic sludge which tends to plug the formation and restrict flow of fluids.

Therefore, it is an object of the invention to provide a solvent and method which are useful in removing damaging water, emulsions, wax, and asphalt from a well.

It is also an object of the invention to provide a solvent and method which are useful in removing damaging water, emulsions, wax, and asphalt from a subterranean formation penetrated by a well.

Further, it is an object of the invention to treat a subterranean formation as an adjunct to other operations carried out therein.

It is also an object of the invention to provide a treating solvent which is nondamaging to the well or to the subterranean formation.

It is also an object of a specific embodiment of the invention to provide a solvent and method which are useful in also removing inorganic deposits from the well or from the subterranean formation.

It is a further object of a specific embodiment of the invention to provide a solvent and method for removing damaging water, emulsion, wax, asphalt, and inorganic deposits without depositing a sludge in the subterranean formation.

Further objects and attendant advantages of the invention will be apparent from the following detailed description and figure in which:

The figure is a phase diagram of some illustrative solutions which may be employed in the practice of the invention.

I have discovered a single-phase solvent which obviates the difficulties and accomplishes the objects hereinabove set forth when employed to dissolve flow-restricting materials from a well or from a subterranean formation. This solvent comprises a solution containing as its essential components an organic solvent for oil and asphalt and a liquid having mutual solubility for oil and water.

The single-phase solvent is able to dissolve whatever undesired accumulations there may be in the well or in the subterranean formation. The solvent removes water blocking from subterranean formations. Thus, clay particles which are swollen by the presence of water, particularly fresh water, are allowed to return to their normal size, thereby increasing the permeability of the formation to flow of fluids therefrom. In addition, the dispersion of shales and their restriction of permeability are prevented. Water films are removed from the surface of the formation. Damaging emulsions which may be formed spontaneously or which result from the drilling fluid which was used to drill the well are also removed. Additionally, where organic deposits such as wax and asphalt form the undesired accumulations, the solvent dissolves them. Further, the solvent can simultaneously remove all such undesired accumulations from the well or from the subterranean formation. Moreover, the solvent components coact to simultaneously remove multilayered deposits, obviating the more complex procedure of determining the order and composition of the respective layers and making preselected multiple injections of specific solvents.

In the practice of the invention, the solvent is injected into a well. The solvent is allowed to soak, dissolve, and dislodge flow-restricting material from the well equipment. The solvent and the dissolved and dislodged flow-restricting material are then produced from the well. Further, the solvent may be injected through the well into a subterranean formation. The solvent may be passed through the formation or passed only part way through the formation and then back out the same well through which it was injected. The portion of the formation into which the solvent is passed before being reversed back out the well may be very small, e.g., 10 feet or less.

The solvent is employed in an amount sufficient to dissolve the flow-restricting material. This amount may range from a barrel or less to clean the well up to 100 barrels or more to treat a subterranean formation. Should an inadequate amount be used in a first treatment, subsequent treatments of lesser or greater amounts may be employed to effect a satisfactory result. Empirical observations on one well in a locale, its flow-restricting material, and the dissolution capacity of the solvent employed afford the best guide as to the amount of solvent required for any particular treatment in the locale.

Any of the known organic solvents for oil and asphalt may be employed. Illustrative of suitable organic solvents for oil and asphalt are carbon disulfide, benzene, toluene, and xylene. Of these, carbon disulfide is preferred from a technological standpoint since it has substantially complete miscibility with the liquid having mutual solubility for oil and water and dissolves significantly greater quantities of organic deposits. Mixtures of the organic solvents may be employed.

By the liquid having mutual solubility for oil and water is meant an organic liquid containing both a hydrocarbon group and a polar group.

A system of classifying organic compounds based upon solubility in various liquids has been developed. This classification has been described, for example, by Shriner and Fuson in The Systematic Identification of Organic Compounds, 8th edition, John Wiley & Sons, Inc. (1940). One class of compounds described by these authors is identified by them as class $S_1$. In this class are the compounds which are soluble in water and in ether. Solubility in benzene can be substituted for solubility in ether. A compound is regarded as being soluble if 0.2 cubic centimeter of the solute will dissolve in 3 cubic centimeters of the solvent at room temperature. Compounds in this class $S_1$ can be employed in the practice of the invention as liquids having mutual solubility for oil and water.

Particular compounds which have been found to be useful include:

Methyl alcohol,
Ethyl alcohol,
Propyl alcohol,
Isopropyl alcohol,
n-Butyl alcohol,
Isobutyl alcohol,
Tertiary butyl alcohol,
2-pentyl alcohol,
Tertiary amyl alcohol,
Dichloro tertiary butyl alcohol,
Allyl alcohol,
Ethylene glycol,
Propylene glycol,
Diethylene glycol,
Butyl glycol,
Tetraethylene glycol,
Dipropylene glycol,
Tripropylene glycol,
Dioxane,
Dimethyl sulfoxide,
Ethylene glycol monomethyl ether,
Ethylene glycol monoethyl ether (generally termed ethyl Cellosolve),
Ethylene glycol monopropyl ether,
Ethylene glycol monobutyl ether (generally termed butyl Cellosolve),
Ethylene glycol monophenyl ether,
Propylene glycol methyl ether,
Diethylene glycol n-butyl ether,
Dipropylene glycol monomethyl ether,
Tripropylene glycol monomethyl ether,
Ethylene glycol dimethyl ether,
Diethylene glycol dimethyl ether,
Triethylene glycol dimethyl ether,
Tetraethylene glycol dimethyl ether,
Glycerol triacetate,
Methyl acetate,
Diethylene glycol monoethyl ether,
Methyl acetoacetate,
Acetone,
Methyl ethyl ketone,
Trichloro acetaldehyde (chloral),
Pyridine, and
Acrylaldehyde (acrolein).

Of these liquids, it is preferred to employ either ethylene glycol monomethyl ether, ethylene glycol monoethyl ether, ethylene glycol monobutyl ether, tertiary butyl alcohol, or diethylene glycol monoethyl ether.

A single liquid having mutual solubility for oil and water may be preferred. On the other hand, mixtures of liquids having mutual solubility for oil and water may be employed. A mixture of liquids has particular use where a liquid, because of economic considerations or otherwise, is desirable for use but its solubility for water is not as high as might be desired. In such cases, the addition of another liquid having a higher solubility for water will provide a mixture having an improved solubility for water. With such a mixture, a smaller quantity of solvent will be capable of treating a given volume of formation around the well borehole. A preferred mixture is one containing ethylene glycol monobutyl ether and ethylene glycol monoethyl ether.

The organic solvent for oil and asphalt may be employed, with the liquid having mutual solubility for oil and water, in any concentration based on the weight of the solution in which a single-phase solution can be formed. However, it is preferred to employ at least 5 percent of the organic solvent for oil and asphalt. In many instances where the dissolution of an organic deposit such as wax or asphalt is desired, as much as 98 percent organic solvent for oil and asphalt may be employed. Generally, the proportion of the solution which is organic solvent for oil and asphalt will be between these two extreme concentrations.

The solvent may contain materials in addition to the organic solvent for oil and asphalt and the liquid having mutual solubility for oil and water.

For example, acid may be added to form a single-phase, three-component solvent, i.e., a solution containing organic solvent for oil and apshalt, liquid having mutual solubility for oil and water, and acid. Such a three-component solvent is even more advantageous because it can dissolve inorganic deposits such as scale or silt when they form a portion of the flow-restricting materials. Where the inorganic deposit is a calcium scale, it is preferred to use hydrochloric acid. A concentrated hydrochloric acid such as one containing 31.45 weight percent hydrogen chloride is preferred. However, more dilute hydrochloric acid such as one containing 15 weight percent hydrogen chloride may be employed. If the inorganic constituent which is to be dissolved is silt, hydrofluoric acid should be employed instead of hydrochloric acid. For general treatment, other acids may be substituted. Illustrative of other acids which may be employed are sulfonic acid, acetic acid, formic acid, or ethylenediamine-tetraacetic acid. Further, mixtures of acids may be employed as the acid component.

In such a single-phase solvent, its three components coactively dissolve the water-based materials, the oil-based materials, the asphaltic materials, and the solid, inorganic particulate matter which reduces the flow of fluids. By such coactive dissolution, the solvent eliminates the difficulties normally associated with layered deposits. Further, the single-phase solvent dissolves and retains in solution any sludge which may be formed as a result of reaction between the oil and the acid.

In employing an acid, it is preferred to use an inhibitor to reduce the tendency of the solvent to corrode the metal goods in the well. Preferred inhibitors are the arsenic-type corrosion inhibitors. However, organic inhibitors such as propargyl alcohol may be employed.

The acid and organic solvent for oil and apshalt may be employed, with the liquid having mutual solubility for oil and water, in any concentration based on the weight of the three-component solution which will provide a single-phase solution. Within the concentration ranges affording a single-phase solution, the solvent may be tailored to dissolve more or less of a particular flow-restricting material, depending on the particular application. Sampling the flow-restricting materials and making empirical determinations of the amount of such materials dissolved by various concentrations of the respective components in the solvent will delineate the particular best composition of the solvent. For example, if wax, oil, and asphalt were not severe, but scale were the primary constituent, the organic solvent for oil and asphalt could be reduced in concentration and that of the liquid having mutual solubility for oil and water, and particularly that of the acid, increased.

Depending on the amount of other two components in the solvent, the solvent may have a concentration by weight of from 5 to 96 percent of organic solvent for oil and asphalt and from 2 to 90 percent of acid. The remainder, at least 2 percent, is the liquid having mutual solubility for oil and water. In dissolving inorganic material such as scale, it is preferred to employ at least 5 percent of acid in the solvent. Ordinarily, the concentrations of acid and organic solvent for oil and asphalt will be between the extreme limits given above, as illustrated hereinafter.

The single-phase solution limitation and concentration limitation within which the tailoring is effected are illustrated in the figure in connection with several solvents. In the figure, the liquid having mutual solubility for oil and water is designated miscible solvent for brevity. For example, when a three-component system of carbon disulfide, butyl Cellosolve, and hydrochloric acid having 31.45 percent hydrogen chloride therein is employed, the area ABC in the figure represents a three-component phase diagram showing limitations of concentrations in weight percent of the various components of the solvent which may be employed, as noted above, and still obtain a single-phase solution. For example, the maximum concentration of hydrochloric acdi which may be employed is about 61 percent, and the maximum concentration of carbon disulfide which may be employed is about 71 percent. The concentration of butyl Cellosolve is simply the remainder of the solvent and ranges from a low of about 24 percent to 90 percent.

A solvent having a composition within the enclosed area DEFG on the phase diagram in the figure has more nearly universal utility than other solvent concentrations within the single-phase area between lines AB and BC. Such a solvent may be employed without making empirical determinations to delineate with particularity the best composition of the solvent to be employed. Such a solvent is thus comprised of from 10 to 40 percent carbon disulfide, from 10 to 40 percent hydrochloric acid, and from 50 to 60 percent butyl Cellosolve. As can be seen in the figure, such a solvent does not approach the two-phase region too closely. However, this solvent satisfactorily dissolves organic and inorganic material which may block the flow of fluids.

As can be seen from curve H in the figure, the use in the solvent of isopropyl alcohol instead of butyl Cellosolve restricts the size of the single-phase region and hence restricts somewhat the wide range of concentrations which may be employed in the solvent. For example, the concentration of carbon disulfide and of hydrochloric acid which may be employed is from 5 to 54 percent by weight, respectively, of the single-phase solvent. The concentration of the isoropyl alcohol is simply the remainder and ranges from a maximum of 90 percent down to the minimum concentration which lies on curve H, e.g., at least 40 percent.

Conversely, as can be seen from curves J and L, the inclusion of acetic acid with the hydrochloric acid increases the respective regions within which a single-phase solution may be obtained for use as a solvent in the invention. In fact, when glacial acetic acid is employed as the acid phase, the resulting components are mutually soluble in all proportions; hence, the entire phase diagram represents a single-phase area for glacial acetic acid with carbon disulfide and butyl Cellosolve.

Thus, in a further example of tailoring the solvent to fit a particular problem, the glacial acetic acid is employed as the acid component in the three-component, single-phase solvent where the solvent is susceptible to becoming diluted with formation waters. Even when severely diluted with formation waters, the solvent employing glacial acetic acid still readily dissolves calcium carbonate scale, yet remains a single-phase solution. The solvent thus is less damaging to the subterranean formation and more effective in removing flow-restricting materials.

In a more specific example of adding a particular acid to the solution, an organic acid such as glacial acetic acid or formic acid is added to improve the wax-dissolving capabilities of the solvent of the invention. Specifically, the improved wax-dissolving solvent should comprise 70 to 96 percent by weight carbon disulfide, 2 to 15 percent by weight of liquid having mutual solubility for oil and water, and 2 to 15 percent by weight of organic acid. The resulting solvent surprisingly dissolves and dislodges the waxes and organic constituents of the flow-restricting material more effectively than single solvents specific therefor.

Other additives such as detergents, surfactants, or deemulsifiers may be dissolved in the solvent for treatment of a subterranean formation. The solvent is capable of dissolving unusually large amounts of most such additives.

The solvent may be employed as a useful adjunct to other operations carried out in the subterranean formation. For example, the solvent may be employed to clean out the formation as an adjunct to a waterflooding process. Alternatively, the solvent may be employed as an adjunct to a miscible flooding process. The solvent is particularly useful as an adjunct to a steam flooding process.

In a steam flooding process, steam is employed to recover oil from a subterranean formation. The steam may be passed through the subterranean formation, reducing the viscosity of the in-situ oil and flowing it to a production well at a distance from the injection well. Alternatively, the steam may be employed in a soaking process, commonly referred to as the "push-pull" method of steam flooding. In the push-pull method of steam flooding, the steam is injected for a period of time, e.g., a few months, and followed by a period of normal production out of the same well. There may be a time of heat soaking between the injection of the steam and the production of hydrocarbons if desired. The solvent is injected in front of or concurrently with the steam in either method of operation.

When the solvent is employed as an adjunct to a secondary recovery process, it may be particularly useful to add detergents, surfactants, or deemulsifiers to the solvent.

The following numbered examples will serve to illustrate the invention.

EXAMPLE 1

In this example, the effect of the solvent in dissolving petroleum wax is demonstrated. Raw, damp wax from the Ferguson No. 27 well in Rincon Field, Calif., was coated onto wire mesh coupons in measured amounts. The coupons were mounted in a conventional dipping apparatus and dipped into and out of the solvent under test. The dips were automatically counted.

The solvent composition tested consisted of 85 cubic centimeters, about 87.7 percent by weight, of carbon disulfide; 5 cubic centimeters, about 3.7 percent by weight, of ethylene glycol monobutyl ether; and 10 cubic centimeters, about 8.6 percent by weight, of acetic acid. Three wire coupons coated with raw Rincon wax were dipped in the solvent composition 43 times, and the amount of wax dissolved and dislodged therefrom was measured in weight percent of that initially present on the coupon. The solvent composition dissolved or dislodged 76.6, 62.3, and 74 percent of the Rincon wax initially coating the wire coupons.

To afford a standard against which to compare the solvent composition, carbon disulfide also was employed as the solvent under test. Three coupons coated with raw Rincon wax were dipped 43 times in the carbon disulfide, and the amount of wax dissolved and dislodged therefrom was measured in weight percent of that initially present on the coupon. The carbon disulfide dissolved or dislodged 36.4, 37.2, and 27.8 percent of the Rincon wax initially coating the wire coupons.

EXAMPLE 2

This example illustrates the effect of the solvent in removing water, oil, and asphalt from a core sample. Virgin core samples of the San Ardo Formation, San Ardo, Calif., were immersed in various solvents to determine relative efficacy of solvents for dissolution of asphaltic oil and water therefrom. The original weights of core sample, oil, asphalt, and water were measured and the respective core samples immersed in the solvents for equal times. The residual weights of core sample, oil, asphalt, and water were then measured. The core samples were then completely cleaned and weighed. The amount of oil, asphalt, and water removed by each solvent was determined in weight percent of the amount which was originally in the respective core samples.

A solvent of 75 percent by volume, 80.8 percent by weight, of carbon disulfide and 25 percent by volume, 19.2 percent by weight, of butyl Cellosolve dissolved 88.4 percent of the oil, asphalt, and water originally in the core samples in the experimental procedure outlined above.

Conventionally, aromatic fractions form desirable solvents for dissolving asphaltic oil. Therefore, Aromatic 1409, a refinery cut containing 55 percent aromatics, was employed as one of the standards against which to compare the solvent. The Aromatic 1409 removed 68.6 percent by weight of the oil, asphalt, and water originally in the core samples when employed in the experimental procedure outlined above.

As another standard against which to compare the solvent, carbon disulfide was employed in the same experimental setup described above. The carbon disulfide dissolved 81.6 weight percent of the oil, asphalt, and water originally in the core samples.

EXAMPLE 3

This example illustrates the effect of the solvent in dissolving a scale containing asphalt intermixed therewith.

Samples of scale were obtained from the Poggi Lease in California. This scale contained asphalt intermixed with the inorganic material. Aliquot portions of at least 5 grams each of this scale were subjected to action of various solvents until the dissolution capabilities of each respective solvent were spent. An extreme limit of reactivity was therefore realized.

One such solvent comprised 16 parts by weight of hydrochloric acid having 31.45 percent by weight of hydrogenchloride, 30 parts by weight of carbon disulfide, and 54 parts by weight of butyl Cellosolve. The resulting solvent dissolved the asphalt, as well as the inorganic material, at a satisfactory rate to achieve a single-phase solution even at the end of the reaction.

As a second solvent, an acid mixture of 50 percent by volume of acetic acid and 50 percent by volume of the above hydrochloric acid were employed in an amount of 20 parts by weight with 30 parts by weight of carbon disulfide and 50 parts by weight of butyl Cellosolve. The resulting solvent gave good dissolution of asphalt and a faster reaction rate than the foregoing solvent but afforded two phases after the reaction was complete. However, the initial solvent was a single-phase solution. Further, the final two phases had a low interfacial tension therebetween such that flow of the two phases within a subterranean formation or into a well will encounter very little difficulty.

As a third solvent, 20 parts by weight of the above hydrochloric acid, 30 parts by weight of carbon disulfide, 27.7 parts by weight of butyl Cellosolve, and 22.2 parts by weight of ethyl Cellosolve were employed. This third solvent was superior to either of the first two in its dissolution of asphalt and dissolved the inorganic matter much more rapidly than either of the first two. For this reason, 10 grams of Poggi scale were employed to allow the dissolution capabilities of the solvent to become spent. Even so, the solvent provided a single-phase solution both before and after the dissolution of the Poggi scale. The addition of the ethyl Cellosolve enabled dissolving more inorganic material than butyl Cellosolve alone.

Having thus described the invention, it will be understood that such description has been given by way of illustration and example and not by way of limitation, reference for the latter purpose being had to the appended claims.

What is claimed is:

1. A multiple-purpose solvent for dissolution of scale, asphalts, wax, emulsions, and water which is a single-phase, three-component solution comprising a liquid having mutual solubility for oil and water containing from 5 to 96 percent by weight of said solution of an organic solvent for oil and asphalt and from 2 to 90 percent by weight of said solution of an acid selected from the group consisting of hydrochloric acid, formic acid, hydrofluoric acid, acetic acid, sulfonic acid, and mixtures thereof.

2. The solvent of claim 1 wherein said single-phase, three-component solution comprises isopropyl alcohol in an amount of at least 40 percent by weight of said solution containing carbon disulfide in an amount of from 5 to 54 percent by weight of said solution and concentrated hydrochloric acid in an amount of from 5 to 54 percent by said weight of said solution.

3. The solvent of claim 1 wherein said single-phase, three-component solution comprises ethylene glycol monobutyl ether in an amount of from 24 to 90 percent by weight of said solution containing carbon disulfide in an amount of from 5 to 71 percent by weight of said solution and concentrated hydrochloric acid in an amount of from 5 to 61 percent by weight of said solution.

4. The solvent of claim 1 wherein said single-phase, three-component solution has a composition falling in the single-phase region of the figure and lying between dotted lines AB and BC in the figure, and contains, as said liquid having mutual solubility for oil and water, from 24 to 90 percent by weight of a miscible solvent selected from the group consisting of ethylene glycol monobutyl ether and isopropyl alcohol, contains from 5 to 71 percent by weight of carbon disulfide, and contains from 5 to 61 percent by weight of an acid selected from the group consisting of concentrated hydrochloric acid and a mixture of concentrated hydrochloric acid and acetic acid.

5. The solvent of claim 4 wherein said single-phase, three-component solution has a composition within the enclosed area DEFG in the figure, contains from 10 to 40 percent by weight of carbon disulfide, contains from 10 to 40 percent by weight of said acid, and contains from 50 to 60 percent by weight of ethylene glycol monobutyl ether.

6. A solvent for dissolution of wax from a well and a subterranean formation penetrated thereby which comprises a single-phase, three-component solution of from 70 to 96 percent by weight of carbon disulfide, from 2 to 15 percent by weight of a liquid having mutual solubility for oil and water, and from 2 to 15 percent by weight of an acid selected from the group consisting of glacial acetic acid and formic acid.

7. A method of treating an oil-containing subterranean formation and a well completed therein which comprises injecting into said well, as a solvent for removing scale, asphalt, wax, emulsion, and water, a single-phase, three-component solution of (1) from 5 to 71 percent by weight of carbon disulfide and (2) from 5 to 61 percent by weight of an acid selected from the group consisting of hydrochloric acid, formic acid, hydrofluoric acid, acetic acid, sulfonic acid, and mixtures thereof, dissolved in (3) at least 24 percent by weight of a liquid having mutual solubility for oil and water.

8. A method of cleaning a well penetrating a subterranean formation which comprises injecting into said well a solvent for dissolution of wax comprising a single-phase, three-component solution of from 70 to 96 percent by weight of carbon disulfide, from 2 to 15 percent by weight of a liquid having mutual solubility for oil and water, and from 2 to 15 percent by weight of an acid selected from the group consisting of glacial acetic acid and formic acid.

9. The method of claim 8 wherein said solvent is also injected into said subterranean formation for a distance of up to 10 feet and is subsequently produced from said subterranean formation through said well.

10. In a method of recovering oil from an oil-containing subterranean formation having at least one well completed therein, in which steam is injected into said subterranean formation to effect recovery of oil therefrom, the improvement comprising injecting a single-phase, three-component solution consisting essentially of carbon disulfide, ethylene glycol monobutyl ether, and surfactant.

11. In a method of recovering oil from an oil-containing subterranean formation having at least one well completed therein, in which steam is injected into said subterranean formation to effect recovery of oil therefrom, the improvement comprising injecting a single-phase, four-component solution of:
  (a) from 5 to 71 percent by weight of carbon disulfide,
  (b) from 5 to 61 percent by weight of an acid selected from the group consisting of hydrochloric acid, formic acid, hydrofluoric acid, acetic acid, sulfonic acid, and mixtures thereof, dissolved in
  (c) a liquid having mutual solubility for oil and water, and containing
  (d) an additive selected from the group consisting of a surfactant and a deemulsifier.

References Cited
UNITED STATES PATENTS

| | | | |
|---|---|---|---|
| 2,124,530 | 7/1938 | Loomis et al. | 166—42 |
| 2,265,923 | 12/1941 | Normand. | |
| 2,721,174 | 10/1955 | Brainerd | 166—42 X |
| 2,753,939 | 7/1956 | Carpenter | 166—41 |
| 2,862,558 | 12/1958 | Dixon | 166—40 |
| 2,910,436 | 10/1959 | Fatt et al. | 166—42 X |
| 2,970,958 | 2/1961 | Shapiro | 252—8.55 |
| 3,110,344 | 11/1963 | Pelzer et al. | 166—9 |
| 3,131,759 | 5/1964 | Slusser et al. | |
| 3,172,473 | 3/1965 | Crowley et al. | 166—41 |
| 3,221,813 | 12/1965 | Glossman et al. | 166—40 X |
| 2,356,205 | 8/1944 | Blair et al. | |
| 3,254,718 | 6/1966 | Dunlap | 166—42 |

CHARLES E. O'CONNELL, *Primary Examiner.*

IAN A. CALVERT, *Assistant Examiner.*